United States Patent
Lynch et al.

(10) Patent No.: US 6,668,156 B2
(45) Date of Patent: Dec. 23, 2003

(54) PRINT MEDIA RECEIVING UNIT INCLUDING PLATFORM AND PRINT MEDIA

(75) Inventors: Larry Lynch, Los Gatos, CA (US); Mark Flowers, Los Gatos, CA (US); Dave Conroy, San Jose, CA (US); Tom Musolf, Mountain View, CA (US); James Marggraff, Lafayette, CA (US)

(73) Assignee: LeapFrog Enterprises, Inc., Emeryville, CA (US)

( * ) Notice: Subject to any disclaimer, the term of this patent is extended or adjusted under 35 U.S.C. 154(b) by 111 days.

(21) Appl. No.: 09/777,262

(22) Filed: Feb. 5, 2001

(65) Prior Publication Data

US 2001/0051329 A1 Dec. 13, 2001

Related U.S. Application Data

(60) Provisional application No. 60/200,725, filed on Apr. 27, 2000.

(51) Int. Cl.$^7$ .................................................. G09B 5/00
(52) U.S. Cl. ........................ 434/317; 434/319; 434/350; 434/351
(58) Field of Search ................................ 434/317, 178, 434/319

(56) References Cited

U.S. PATENT DOCUMENTS

| | | |
|---|---|---|
| 2,182,334 A | 12/1939 | Crespo |
| 2,932,907 A | 4/1960 | Stieber et al. |
| 3,292,489 A | 12/1966 | Johnson et al. |
| 3,798,370 A | 3/1974 | Hurst |
| 3,911,215 A | 10/1975 | Hurst et al. |
| 4,136,336 A | 1/1979 | Abe et al. |
| 4,220,815 A | 9/1980 | Gibson et al. |
| 4,630,209 A | 12/1986 | Saito et al. |
| 4,686,332 A | 8/1987 | Greanias et al. |
| 4,706,090 A | 11/1987 | Hashiguchi et al. |
| 4,802,092 A | 1/1989 | Harte |
| 4,853,498 A | 8/1989 | Meadows et al. |
| 4,853,499 A | 8/1989 | Watson |
| 4,913,463 A | 4/1990 | Tlapek et al. |
| 4,922,061 A | 5/1990 | Meadows et al. |
| 5,007,085 A | 4/1991 | Greanias et al. |
| 5,030,117 A | 7/1991 | Delorme |
| 5,057,024 A | 10/1991 | Sprott et al. |
| 5,113,178 A | 5/1992 | Yasuda et al. |
| 5,117,071 A | 5/1992 | Greanias et al. |
| 5,149,919 A | 9/1992 | Greanias et al. |
| 5,157,384 A | 10/1992 | Greanias et al. |
| 5,220,136 A | 6/1993 | Kent |
| 5,417,575 A | 5/1995 | McTaggart |
| 5,485,176 A | 1/1996 | Ohara et al. |
| 5,517,407 A | 5/1996 | Weiner |
| 5,520,544 A * | 5/1996 | Manico et al. ............... 434/317 |
| 5,575,659 A | 11/1996 | King et al. |
| 5,686,705 A | 11/1997 | Conroy et al. |
| 5,877,458 A | 3/1999 | Flowers |
| 6,064,855 A * | 5/2000 | Ho .............................. 434/317 |
| 6,322,369 B1 * | 11/2001 | Patterson et al. ........... 434/245 |
| 6,363,239 B1 * | 3/2002 | Tutt et al. ................... 434/317 |
| 6,416,326 B1 * | 7/2002 | Oh .............................. 434/178 |

OTHER PUBLICATIONS

"Learning to use Super Speak and Read", 11 pages, (1990).
"Coleco My Talking Computer," Play and Learn Electronics, p. 57, (1987).
"Teach Me Reader," Playskool advertisement (1987).

* cited by examiner

*Primary Examiner*—Joe H. Cheng
*Assistant Examiner*—John Sotomayor
(74) *Attorney, Agent, or Firm*—Townsend, Townsend & Crew LLP

(57) ABSTRACT

A print media receiving unit is disclosed. In one embodiment, the print media receiving unit comprises a platform that includes a surface adapted to receive a print medium comprising a spine. The spine may be disposed in a spine receiving portion in the platform. A location detection system capable of determining a location of a selected region of the print medium may be associated with the platform.

49 Claims, 11 Drawing Sheets

PRINT MEDIA RECEIVING UNIT INCLUDING PLATFORM AND PRINT MEDIA

CROSS-REFERENCES TO RELATED APPLICATIONS

This application claims the benefit of U.S. Provisional Patent Application No. 60/200,725 filed Apr. 27, 2000, which is herein incorporated by reference in its entirety for all purposes.

FIELD OF THE INVENTION

Embodiments of the invention relate generally to platform-based interactive systems that provide audio or visual outputs. Other embodiments are directed to interactive print media and games.

BACKGROUND OF THE INVENTION

There are a variety of interactive electronic book devices in which a book is placed on a platform. The platform includes a detection system where a generated response depends upon the portion of the book the user points to with a stylus or other pointing device. Such interactive books are sometimes known as "talking books," although more generally an interactive book may use audio and visual outputs to interact with a user. Commonly, an interactive book device is configured to provide an audio output related to a stylus position. For example, an interactive book device for children may speak the names of words which are pointed to or play games when the child points at a picture. Although interactive books are commonly sold as children's toys, they also have numerous other potential applications as well.

One form of interactive book device utilizes an electronic proximity detection system to detect the position of a stylus relative to a support surface, with the book resting on the support surface such that the stylus is used to point to a region on an open page of the book. This permits a microprocessor or other control element to determine the location of the book to which the user pointed with the stylus. There are several technologies commonly used to electronically sense the position of a stylus. In one approach, the support surface is a conventional graphics tablet and the stylus is a conventional graphics tablet pen. For example, the support surface of an interactive book may comprise a conventional graphics pad having an array of sensing elements that are capacitively or inductively coupled to the stylus. In another approach, the support surface may contain a grid-like array of radiating antennas that are sequentially operated, such that the position of a stylus may be determined by analyzing which of the antenna elements produces the strongest signals in the stylus. Still another approach is an electrographic sensor in which the support surface includes a conductive layer having three or more contacts, with the contacts being pulsed in pairs with an RF signal such that the stylus receives signals traversing at least two different paths, thereby permitting the position of the stylus to be determined using a triangulation algorithm. An electrographic sensor using a triangulation algorithm is described in U.S. Pat. Nos. 5,686,705 and 5,877,458, the contents of which are hereby incorporated by reference.

FIG. 1 is a perspective view of a conventional prior art interactive book device similar to that of U.S. Pat. No. 5,575,659. As can be seen in FIG. 1, a support surface 2 has a graphics tablet 1 upon which a book 3 having open pages 4 and 5 is disposed. A graphics tablet pen 6 is used to point to regions on the open pages of the book. An electrical cable 7 couples graphics tablet pen 6 to graphics tablet 1. The position of the graphics tablet pen 6 relative to the graphics tablet 1 is transmitted via cable 8 to an electronic control element 9 and associated audio device 10 for producing an audio output 12 related to the position of the pen 6. For example, a user may use the pen 6 to point to a region 20 or 22 on an open page. In turn, the electronic control element 9 and audio devices may play a message related to region 20 or 22, i.e., control element 9 utilizes the position data of the graphics tablet to determine a corresponding message or sound to be presented. For example, region 20 or 22 may contain a picture of a cow such that when a user points the pen to region 20 or 22, the control electronics directs the audio device to play a recording of a cow's moo.

In an interactive system of this type, high resolution is desirable so that the user can touch or point a pen to a large number of different pictures, symbols, or words in the book. However, conventional interactive book devices have poor resolution between neighboring regions. There are several physical limitations on the accuracy with which a pointer may be used to point to an area of interest. One limitation is the accuracy of the detection system used. For example, if the graphics tablet has a 3 millimeter resolution, interactive symbols must be more than 3 millimeters apart.

One factor that limits the resolution of conventional interactive book systems is the accuracy with which the pages of a book are positioned relative to the detection system. Conventional devices allow the booklet or document to shift slightly from side to side, thus interfering with resolution. Further, in a conventional system, the pages do not lie flat and evenly on the surface where detection takes place, for example, because the book binding constrains the pages of the book, as shown in prior art FIGS. 1 and 2.

As shown in the illustrative side view of the prior art, in FIG. 2, conventional interactive book devices are limited by the accuracy of using a pointer 240 to point to a specific region on a booklet page because of the inherent flexure of the pages 210, 212, 214, 216, 220, 222, 224, and 226 relative to a binding 230. Each page is slightly curved relative to the underlying support 250. Moreover, the page curvature will depend, at least partially, on how hard and the angle with which a user presses down upon an open page with the pointer. When a user points to, say, point P, the variable curvature of page 210 may result, for example, in point P shifting from a position directly over detector 268 to one between detector 266 and 268 or to a position between detectors 270 and 268. For example, if a user presses the pointer hard upon the page, it will flatten and point P will move transversely towards detector 266. Conversely, if the user applies no pressure, the page will have its maximum curvature and point P may lie closest to detector 270.

In addition to the above problem, in conventional systems, the entire booklet may shift position as the user turns the pages of the book. Referring again to FIG. 2, forces are transmitted to binding 230 from the act of turning the open pages. These forces can act to move binding and shift the entire book relative to the support and detection system it houses.

Another drawback with conventional interactive books is that the user must remember to point to particular location indicia or symbols on each page of the book so that the audio signals can be correctly associated with the symbols and text on a particular page. For example, the symbol may be a fish on one page, a bird on another, and a tiger on another page. Each location indicia or symbol is placed on a different sub-region along a border region of each page. However, if the user forgets to touch the pointer to the required location symbol, the control electronics may be confused regarding which page is open. Other than a written instruction, there is no way to remind the user of the need to touch the page-noting symbol with the pointer so a child who forgets to turn the page is only confronted with the audio signals that do not correspond to the images.

Embodiments of the invention address these and other problems.

SUMMARY OF THE INVENTION

Embodiments of the invention are directed to print media receiving units, systems using print media receiving units, and print media for print media receiving units and systems.

One embodiment of the invention is directed to a multi-page print media receiving unit comprising: a) a platform including a position element receiving portion; b) one or more page tabs located near either one or two ends of a page pivot line corresponding to the position element receiving portion; and c) borders located on the platform at one or more extremes of page travel away from the position element receiving portion.

Another embodiment of the invention is directed to a multi-page book for use with a print media receiving unit comprising: a) a spiral spine comprising a helical cord; b) a plurality of pages attached to the spine through perforations larger than the cord; and c) notches on at least one of the upper and lower corners of each page near the spine; wherein the notches are adapted to slide over tabs in the print media receiving unit.

Another embodiment of the invention is directed to a print media receiving unit comprising: a) a platform comprising a surface adapted to receive a print medium; b) a location detection system capable of determining a location of a selected region of the print medium; and c) a socket in the platform wherein the socket is capable of receiving a memory device.

Another embodiment of the invention is directed to a print media receiving unit comprising: a) a platform comprising a surface adapted to receive a print medium; b) a location detection system capable of determining a location of a selected region of the print medium; and c) a finger well, wherein the finger well is disposed to a side of the surface.

Another embodiment of the invention is directed to a print media receiving unit comprising: a) a platform comprising a surface adapted to receive a print medium comprising a spine; b) a spine receiving portion in the platform configured to receive the spine of the print medium, the spine receiving portion having a first end and a second end; c) a location detection system capable of determining a location of a selected region of the print medium; and d) a plurality of tabs in the platform, wherein the tabs are disposed at a location proximate to at least one of the first end or the second end of the spine receiving portion.

Another embodiment of the invention is directed to a print media receiving unit comprising: a) a platform comprising a surface adapted to receive a print medium comprising a spine, wherein the surface is defined by edges that restrict the movement of the print medium while the print medium is on the platform; b) a spine receiving portion configured to receive the spine of the print medium, the spine receiving portion having a first end and a second end; c) a location detection system capable of determining a location of a selected region of the print medium; d) a plurality of tabs in the platform, wherein the plurality of tabs are at least one of the first end and the second end of the spine receiving portion; e) a socket in the platform wherein the socket is capable of receiving a memory device; and f) a stylus operatively coupled to the platform, wherein the stylus is adapted to select regions of the print medium.

Other embodiments are directed to systems including the print media receiving units and the print media.

These and other embodiments of the invention are described below with reference to the Figures.

DESCRIPTION OF THE SPECIFIC EMBODIMENTS

Figure 1:
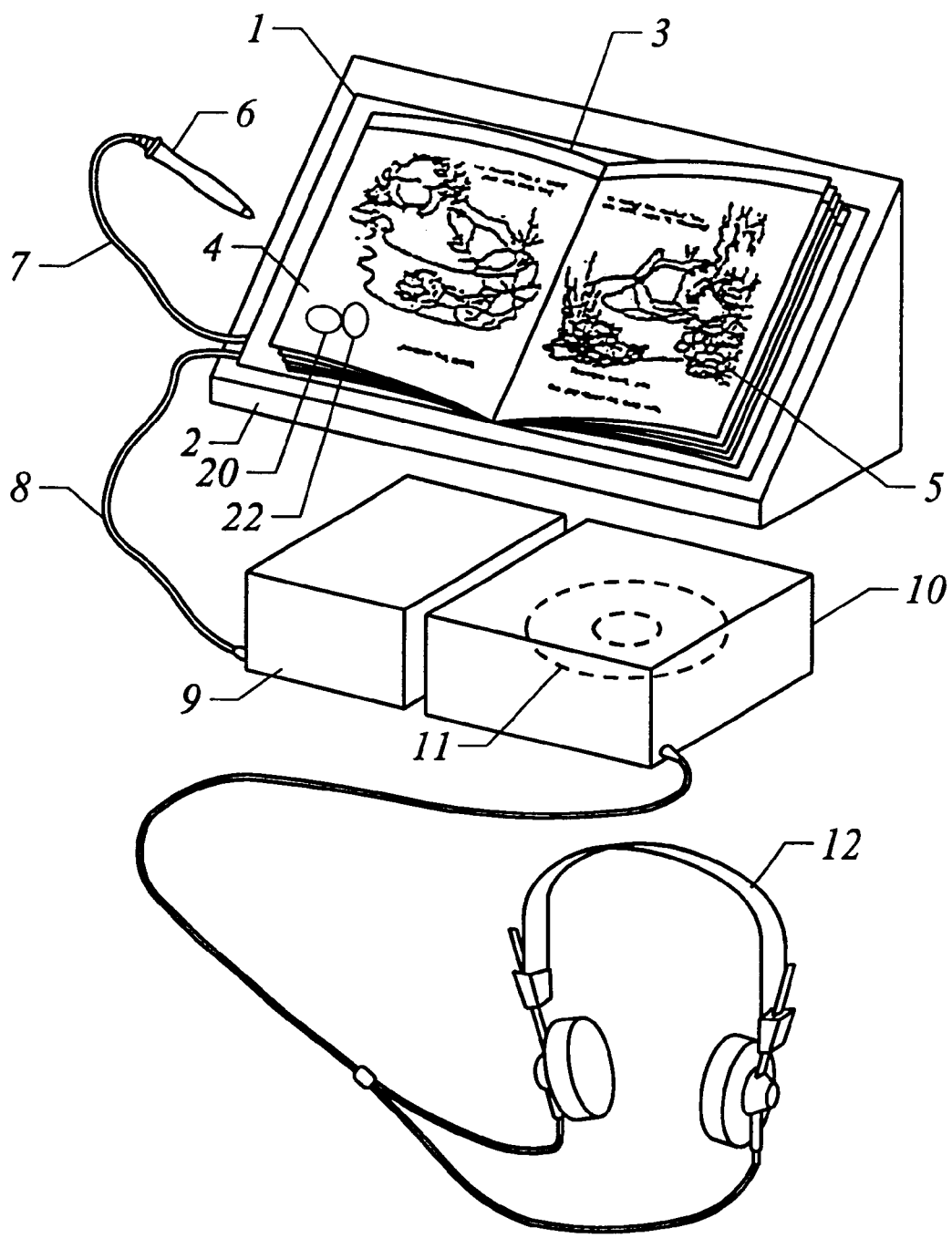
FIG. 1 shows a perspective view of a prior art interactive reading system.
Figure 2:
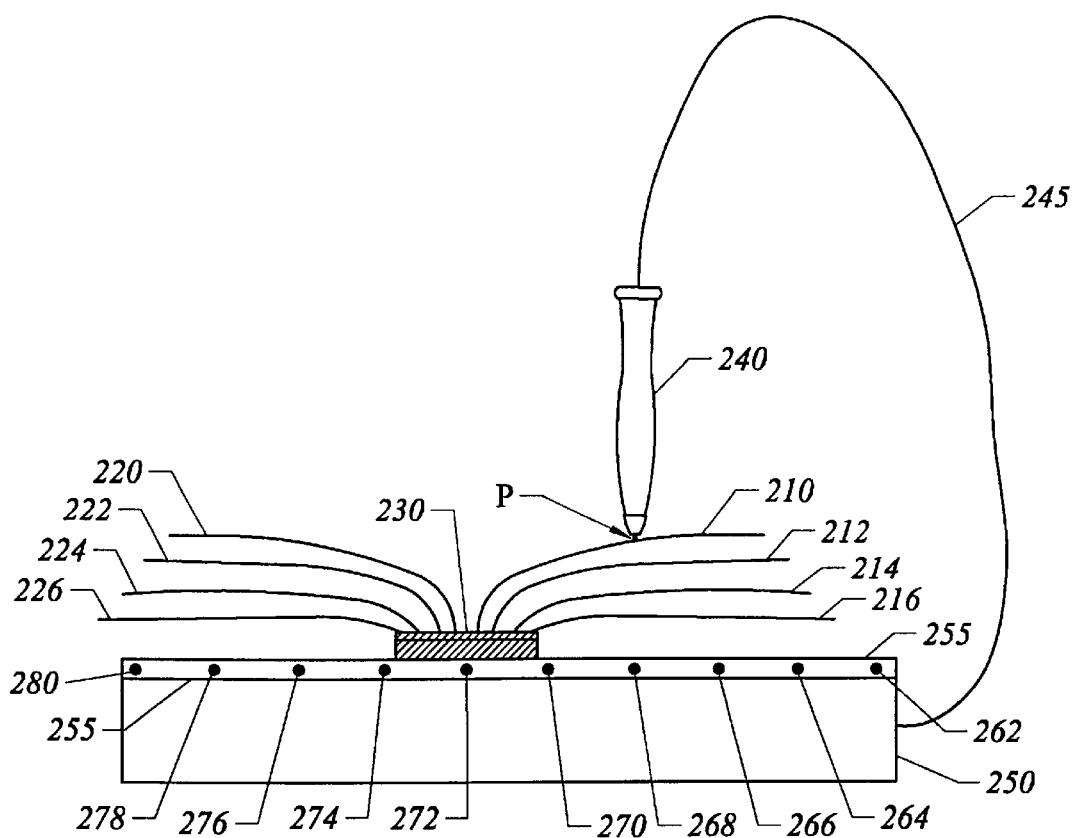
FIG. 2 shows a side view of a prior art interactive reading system.

Embodiments of the invention are directed to interactive media, an associated interactive media receiving platform, and a registration system for positioning the media on the platform. Interactive print media include documents, books, and games, particularly educational books and games. It is also contemplated that a ridged 3-dimensional relief form can be placed on the interactive platform. In embodiments of the invention, the system can be handled easily by children as well as adults.

In one embodiment the invention, the invention comprises a platform, its associated electronics, and a book for use with an interactive reading and teaching system. The book may contain informational, instructional or entertainment material. The platform is combined with a microprocessor, speaker, stylus, and electronic means for detecting the area on the platform to which the stylus is pointed. As the user turns the pages of the book, the user points to particular symbols, images, graphic patterns, or elements of graphic patterns on the pages of the book. Much of the discussion below, for purposes of illustration, refers to symbols, but the invention is not so limited. When a user points or touches the stylus to certain symbols on a page of the book, an audio signal is initiated that is informational, educational or entertaining. For example, a word may be pronounced; a letter or entire word may be phonically sounded; a joke may be told; the user may be asked to find and touch a word or image on the page; or any of many other interactions may be initiated.

In another example, after the user selects text or symbols on a print medium, a question may be asked to the user. Alternatively or additionally, the user may answer the question using the stylus. For example, the user may select a picture corresponding to a car if the question "can you find the car?" is asked. The print media receiving unit may respond to the user's selection by, for example, indicating that the selection is either right or wrong.

The platform embodiments may each have an inventive structural design that allows easy placement of a book with a binding on the platform so that the pages of the book lie flat on the surface of the platform. The book and its pages also are easily positioned so that the pages consistently locate over a specific region of the platform, even when placed by a child. As the pages are turned by a user who progressively views and interacts with each page, the pages, after being turned, continue to lie flat either on the surface of the platform or as they stack on either side of the book binding. Furthermore, the book remains in its initial position on the platform in spite of the manipulation that occurs when the book pages are turned.

In some embodiments, the platform may have a detection mechanism to determine when a user turns a page. For example, in order for the symbols on a page to be properly associated with interactive dialog, a microprocessor may be cued as to the page that the user is viewing. Typically, this is done by instructing the user to point to or touch the stylus to a symbol on the page. The selected symbol location may serve to cue the microprocessor as to the particular page with which the user is interacting. However children, and some adults, sometimes forget to touch the page information symbol each time a page is turned. The inventive platform is configured so that when a user turns a page, the users' fingers extend into indentations in the platform. The indentations may be located along the outside edges of the opened book. A light beam is projected along the indentation and when a hand or finger breaks the light beam, that event is detected by the microprocessor.

The platform is additionally configured so that the position of the book and pages is consistently located in proper relationship to the programmed regions for specific symbols. Consistent book positioning is accomplished by providing a slot to accommodate the binding of the book. The pages of the book lie flat because the book is bound by, for example, a spiral, comb, or other ring type binding that allows the pages fall open and lie flat on a surface. Spiral binders are desirable as they allow a book to be manufactured at less cost, than for example, a book with a ring type binder. In embodiments of the invention, the pages of the book are positioned consistently because of several design features of the platform and book. Guide tabs, which are described in greater detail below, guide a page of the book as it is turned and falls into a recessed form of the platform that captures and evenly stacks the pages.

The platform may additionally have a socket to receive a flash cartridge or other memory device for augmenting any story or other material contained in the microprocessor and associated computer elements. In other embodiments, the platform may have a wireless transceiver that receives augmenting information for the print medium on the platform. Another wireless transceiver may be located at a computer apparatus (e.g., a client computer) that is away from the platform. This wireless transceiver may supply the augmenting information. The wireless transceivers may be adapted to transmit or receive wireless signals using RF (radio-frequency) or IR (infrared) transmission.

In some embodiments, data that modifies code in the print media receiving unit may be provided via the cartridge or the wireless transceiver. Data may be used to add code or update code that is present in the print media receiving unit. For example, data that replaces code or modifies how the code is interpreted or run on the print media receiving unit may be provided to the print media receiving unit via the cartridge of the wireless transceiver.

Figure 3:
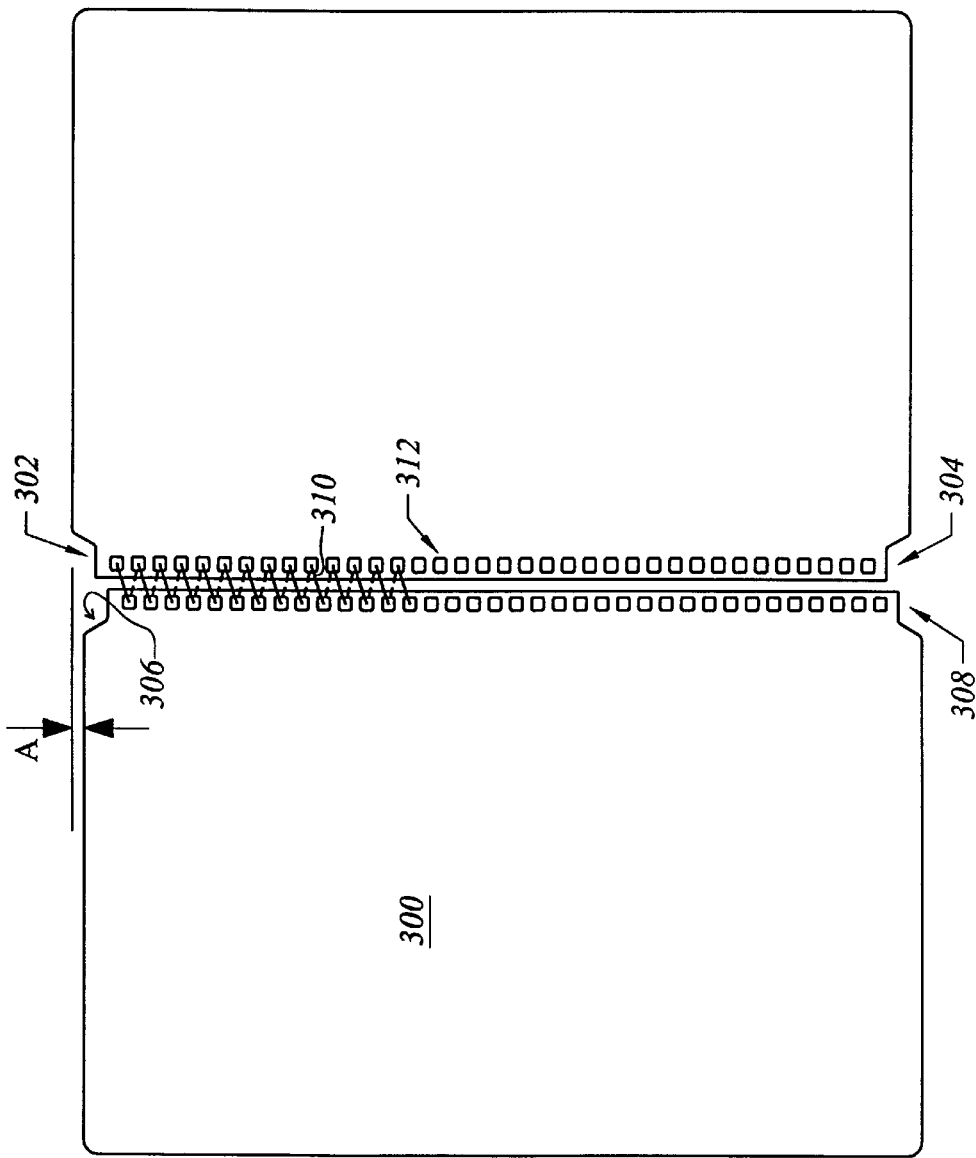
FIG. 3 shows a top view of a book element of the present invention.

FIG. 3 shows a top view of one embodiment of a type of print media designed for use in the inventive interactive print media system. The print medium shown in FIG. 3 is a book showing a portion of a spiral spine. However, it is understood that the design of the platform may accommodate any print medium. For example, the design may accommodate print media in the form of single sheets or books containing multiple pages of text, figures, symbols and other indicia. Suitable single sheets may include print media in the form of cards or placemats. In these single sheet embodiments, the print media need not have a spine and the print media receiving unit upon which it is disposed may or may not have a position element receiving portion that is adapted to receive a spine. The design may also accommodate graphical patterns such as those that are used in game board designs like checkers, backgammon or other board games. Various media materials, weights and textures can be accommodated.

Print media designed according to the principles illustrated in FIG. 3 are easily placed in a print media platform (shown in FIG. 4) or exchanged for other similarly designed items. The print media may be designed for, for example, a young child. The print media design according to the illustrated principles settles into its proper location on the platform automatically or with very little adjustment.

Referring to FIG. 3, page notches 302, 304, 306, and 308 fit over tabs and wedges in the platform, and are described in further detail below. The page notches, when they slide over a tab, position a single page with notches into a specific orientation on the platform. If the print media is a multi-page book, it is typically bound by a spiral, comb, or ring type binding. The perforations in the pages 312 through which the spiral, comb, or ring binding pass, are larger than the diameter of the rods forming the spiral, comb, or ring-type binding so that the pages of the book may be easily turned. The back and forth movement that the large perforations allow is controlled by page notches 302, 304, 306, and 308 which fit over positioning tabs on the platform. When the page notches fit over the tabs, the pages may move as far away from the spiral or ring binding as the size of the perforations will allow.

In some embodiments, sharp edges and square corners were avoided where possible everywhere on the printed media. Eliminating sharp edges and square corners reduced the possibility of the pages potentially catching and snagging on the borders or edges in the platform and prevented the page corners from becoming dog eared.

A spiral binding 310 was used in the embodiment shown to optimize cost and strength considerations. Since a spiral has a pitch (e.g., a distance between adjacent windings in a spiral spine), a page on the left hand side of the binding was somewhat displaced from the page on the right hand side. It can be seen from FIG. 3 that the page travels down the spiral binding 310 as it is turned from right to left. It can similarly be seen in FIG. 3 that the top perforation of the left hand page is offset lower than the top perforation of the right hand page. The offset, illustrated as a distance A in FIG. 3, is equal to or substantially equal to the pitch of the spiral binding. The tabs in the platform, over which the page notches fit, are positioned to accommodate this offset.

Figure 4:
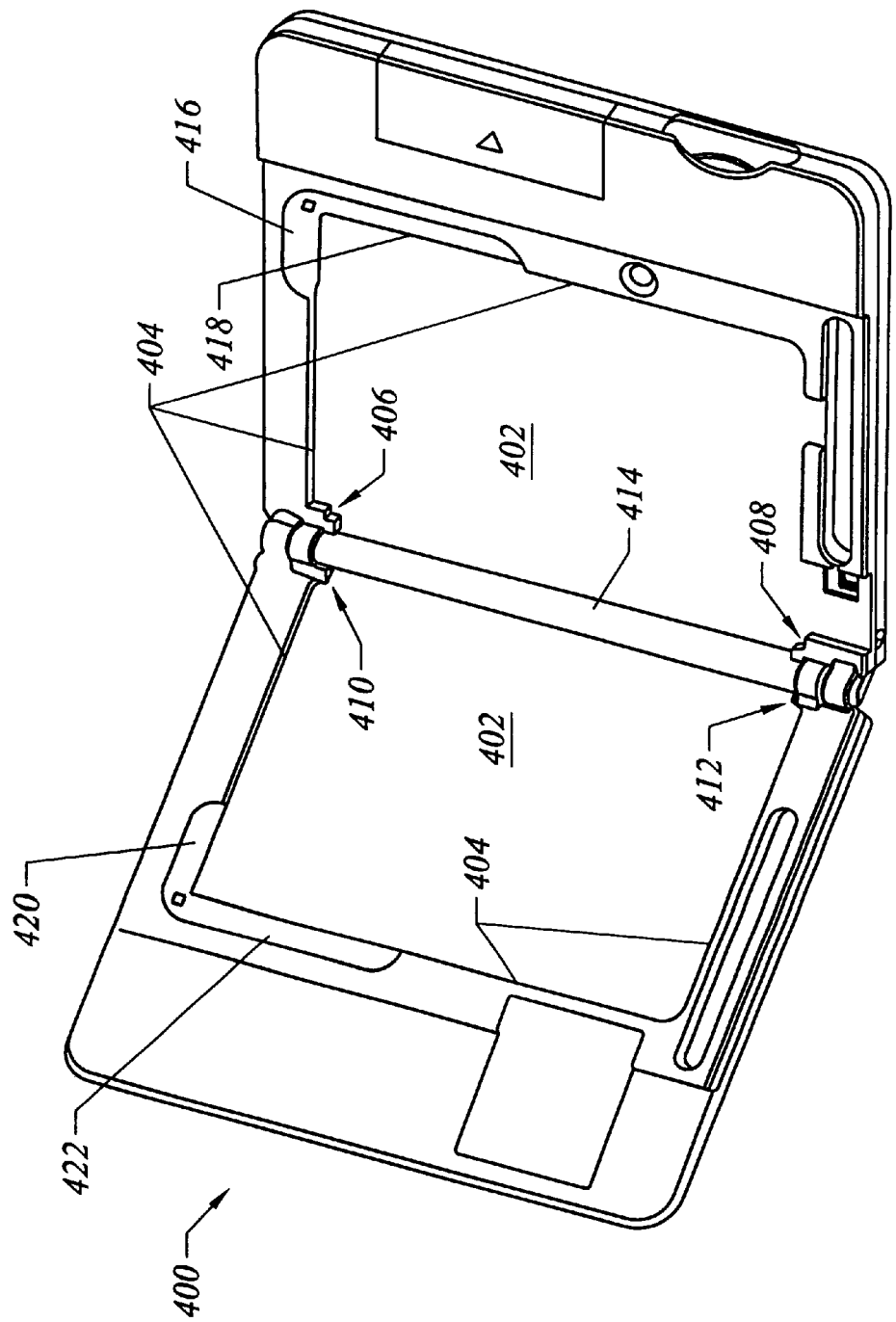
FIG. 4 shows a perspective view of a foldable platform.

FIG. 4 shows a perspective view of the platform 400. A long slot 414 in the center of the platform accommodates binding 310, or other positioning element, of a multi-page book. The slot width is greater than the spiral or other binding used, so that a positioning element, like a binding, can float to a neutral position in relationship to the left and right sides. The pages of the book can fall flat into a recessed area 402 of sufficient depth to capture the pages of the book. The recessed area 402 is formed by two portions that are joined by hinges. Each recessed area region on each portion of the platform is bordered on three sides by edges 404. In some instances, the edges 404 may be referred to as retention borders. The borders restrain page movement in the direction of the borders. The borders restrict or determine the farthest distance away from the spine the page or pages can travel, in other words, the extreme of travel.

Although the position element receiving portion shown in FIG. 4 is a long slot 414, the position receiving element may have other forms in embodiments of the invention. For example, the position element receiving portion may be a recess in some embodiments. In other embodiments, the print media receiving unit need not have a position receiving element to keep the print medium on the print media receiving unit consistently positioned. For example, the print media receiving unit may include one or more positioning devices that can secure the print medium to the print media receiving unit. Examples of positioning devices may include clips, clamps, and re-positionable adhesives. These or other positioning devices can temporarily secure a print medium to the print media receiving unit so that it is consistently positioned on it. The positioning devices may be disposed under the print media or may alternatively be disposed to an edge of the print medium. For example, the print medium may be secured to the surface of the print media receiving unit by one or more clips or clamps that secure the edges of the print medium to the print media receiving unit. In another example, the print medium may have notches at its edges and may be positioned by structures on the print media receiving unit that fit within those notches. The movement of the print medium can thus be confined, and the print medium can be consistently positioned on the surface of the print media receiving unit.

Tabs 406, 408, 410, and 412 are located on the internal corners of the recessed area regions, near opposing ends of the slot 414. They are positioned so that page notches 302, 304, 306, and 308 fit over the tabs.

Figure 5:
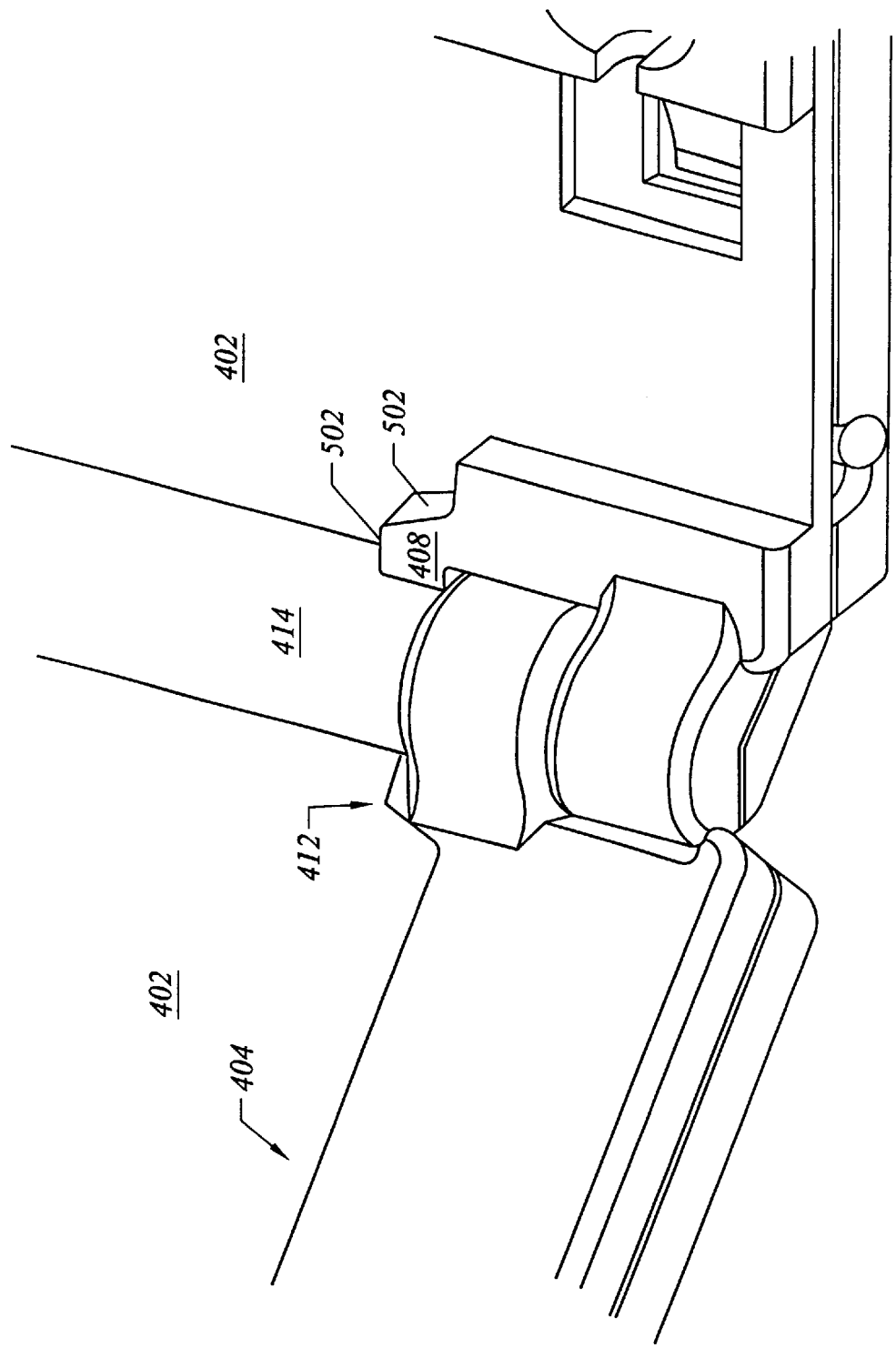
FIG. 5 shows a detailed perspective view of the platform guide tabs that guide the book pages to a generally consistent position with respect to the platform.

FIG. 5 shows a detail of tab 408 and illustrates features common to each of tabs 406, 408, 410, and 412. The side walls 502 of the tab 408 have a slight taper or draft so a page that falls on top of the tab will be easily guided down the tab toward the border edge 404, where the page movement will be stopped. This design makes for very easy page turning and moves the page into recess 402 toward the opposite border. The recesses 402 may be offset to accommodate the offset, if any, of the pages of the open book on opposite sides of the spine. Preferably, for smooth operation, the draft on tabs 406, 408, 410, and 412 is between about 5 degrees and about 7 degrees, though it may be larger or smaller than that amount and still work properly. For similar reasons, to increase the ease of page turning without the page becoming caught on the tabs, the top edge of each tab 504 was slightly chamfered to allow the page or sheet to self-guide easily down over the tab. The degree of chamfer may vary. In some embodiments, the chamfer may be a 30 degree chamfer (or less).

As shown in FIGS. 4, 5, 8C, and 9, the platform may be configured to change from an open to a closed position as portions are joined by one or more hinges about slot 414. Tabs 406, 408, 410, and 412, shown in FIGS. 4 and 5, also provide a retention feature for the print media when the platform is folded with the print media in place inside the closed platform. The print media cannot be extracted or fall through the open slot area 414 because of the step created by the tabs 406, 408, 410, and 412. Tabs 406, 408, 410, and 412 can be configured in other shapes than those shown in the Figures. The tabs can be, for example, square, semicircular or points like, for instance, a tip or head of a pin.

When a multi-page book is being used in the platform, it is helpful to break some section of border 404 to make it easier to grasp pages for turning or to remove the book entirely. In the embodiments shown, this feature was presented in the form of finger wells, 416, 418, 420, and 422. As shown in FIG. 4, finger wells 418 and 420 run along the long, side, edges of the book pages, while finger wells 416 and 422 run along the top edges. As shown in FIG. 4, the finger well pairs 416 and 418, and 420 and 422 may be integrally formed with respect to each other and each pair may form a perpendicular depression coinciding with a corner of a page of the book.

In some embodiments, the finger wells contained a mechanism to signal the microprocessor that the user was turning the page. For example, a light beam was established in the finger wells. When the light beam was broken, a signal was sent to the microprocessor that a page turning attempt had been made. This signal prompted the microprocessor to issue a query to the user, reminding him or her to touch the stylus to a page-number symbol in the book. This is particularly useful when children are using the book. To reinforce the likelihood that the user would turn pages from the finger well, the border height 404 in all other areas was constructed to make it difficult to access the pages or sheets, thereby encouraging the user to place the finger in the desired location for all page turns.

Figure 6A:
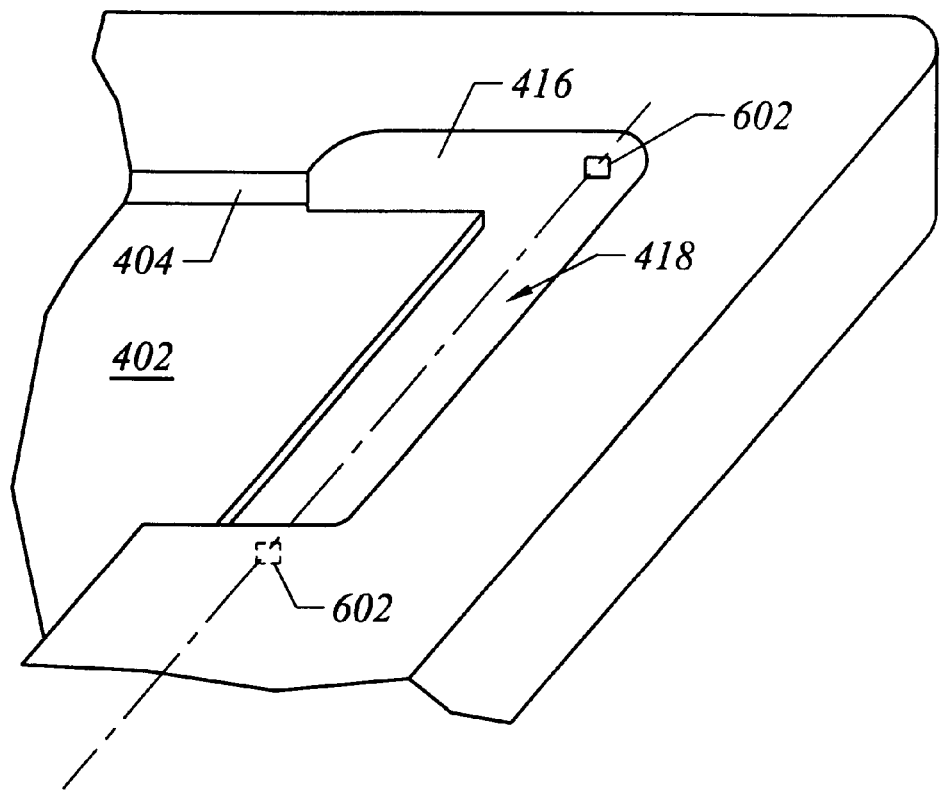
FIG. 6A shows a detailed perspective view of the light beam and right side fingerwell according to an embodiment of the invention.

FIG. 6A shows detail of finger wells 416 and 418 that may be used in embodiments of the invention. The length of the finger wells was held to a length that provided an opening large enough to be comfortable for access to the sheet or page edge and to provide a reasonable operating space for optical-electronic emitting and detection devices 602. In addition, the border edge 404 was of sufficient length to secure and retain the page or sheet position in recess 402.

In this embodiment, an aperture is created at each end of finger wells 418 and 422. These apertures are in vertical and horizontal alignment with each other. Behind these apertures, a set of positioning ribs and light barriers are formed in the housing for the purpose of positioning and securing a light emitting diode at one end and a light detecting diode at the other. The light emitting diode and the light detecting diode may be in-line and/or squared with each other. These devices are recessed to reduce the interference of ambient light and to reduce the risk of light "bouncing" around a finger or obstruction and being "seen" by the detector. As a finger enters the finger well, the light beam between the devices 602 (a light emitter at one end and an associated light detector at the other end) is broken and the microprocessor operating system will suspend any response the system would normally make if the user touches the stylus to a symbol in the book. Instead, the audio system is overridden by an audio prompt to the user to touch the stylus to a page number symbol. For example, the audio prompt may be, "Touch the Green Go Button at the side of the page". After the "Go Button" is touched with the stylus, the operating system selects the proper response code set for the page or sheet in use.

In one book embodiment, "Green Go Buttons" are incorporated into the border artwork for all pages and cover of each book or each sheet of text or graphics. These Go Icons are in slightly different locations on each page. That is, they are indexed along the edge of the page, and are given a location reference and value in the software code. This code will be different for each page within a book or sheet within a set. This code then identifies the page and allows access to the code appropriate to that page.

The software operating system controls the function and response to an obstruction of the light beam between the devices 602 in finger wells 418 and 422. It may have a lock out feature that disables the finger detection function should the IR emitting device fail or if the detector fails or is blocked for an extended period. This failsafe routine will allow continued use of the product but without the "Touch the Go Button" prompt. The prompt routine will be reestablished if the blockage is removed or if the light emitting diode(s) (LED(s)) is repaired.

Top finger wells 416 and 418, allow the user to access the page from the top, but those finger wells may be short so that part of the hand is bound to obstruct the top light emitter or detector. Typically, the light beam used is an infrared (IR) light beam generated by an LED.

Figure 6B:
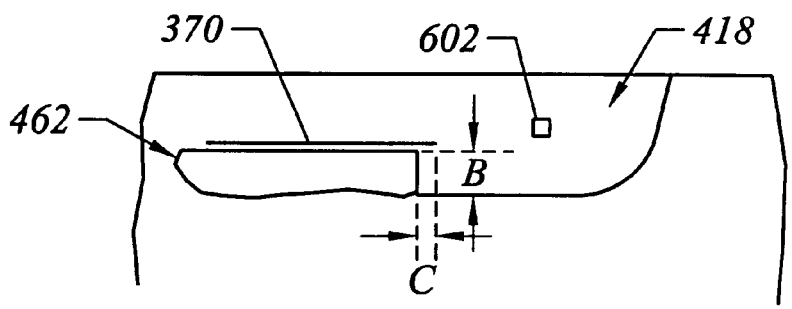
FIG. 6B shows a detailed side-view of the right side finger-well according to an embodiment of the invention.

FIG. 6B shows a cross section of the finger well 418. A slight recess in the area of the finger well 418 and directly under the edge of the sheet 370 makes it easier to lift a page at that location. The surface of the platform portion 462 and the bottom of the finger well 418 may be separated by a distance B. The page 370 extends over the edge of the surface of the platform portion 462 a distance C, so that a user's fingers can manipulate the sheet 370. The user is encouraged to use the finger well location to turn pages, to more likely trigger the light beam detection and subsequent prompt for entering the page number symbol with the stylus.

Figure 7:
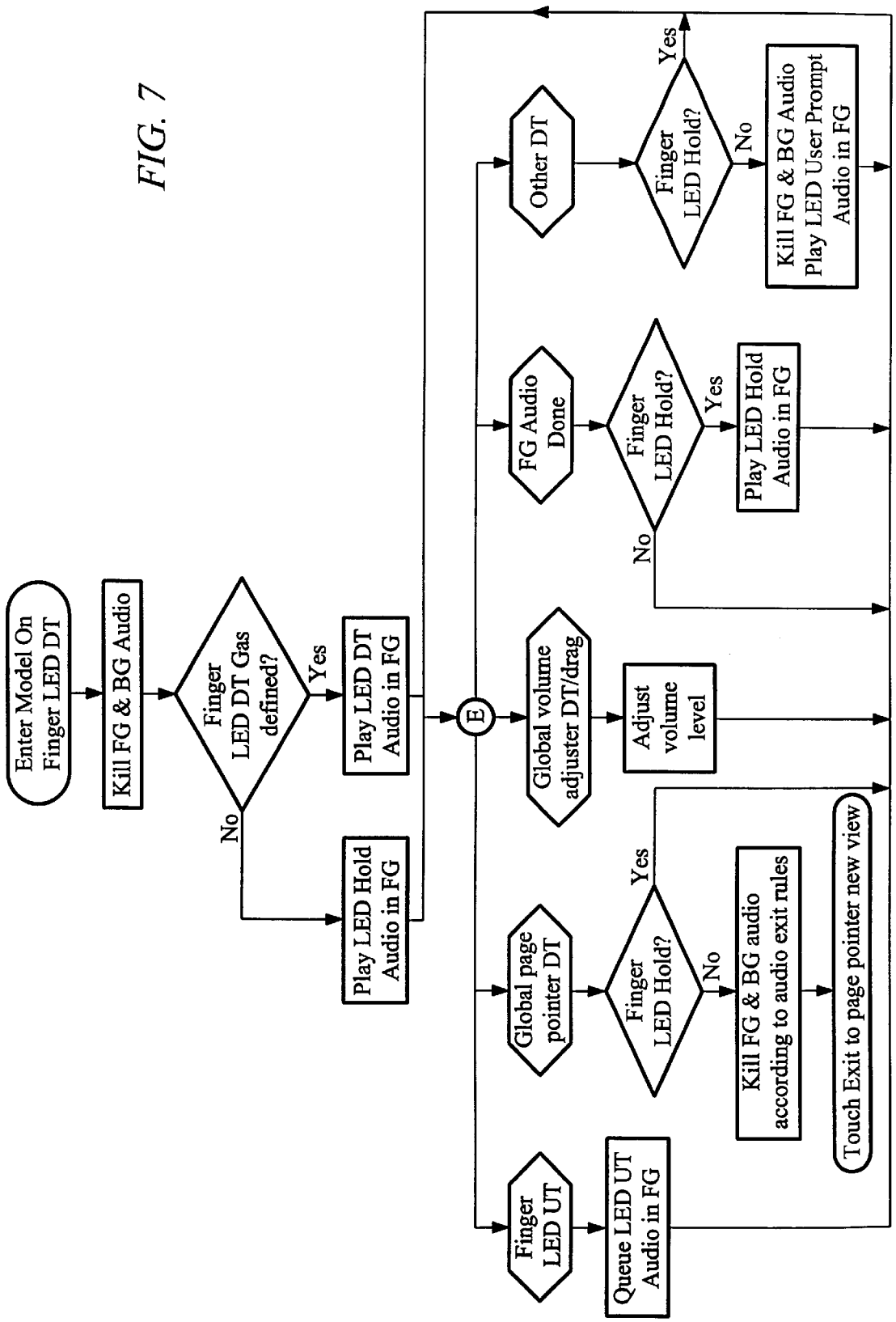
FIG. 7 shows a flow chart of the light beam finger-well logic.

FIG. 7 shows a Flow Chart of the finger well light beam logic used in embodiments of the invention. Table I, below, specifies the code data fields to be used in the finger well process diagramed in FIG. 7.

TABLE I

Model Data Fields

| | |
|---|---|
| Down Transition GAS List | When the beam of either one of the finger LED's is broken, this GAS is played. If empty, nothing is played. |
| Hold GAS List | When the beam of either one of the finger LED's is broken and foreground (FG) audio is done, then play this GAS. |
| Up Transition GAS List | When the beam of either one of the finger LED's was broken and now is not broken, play this GAS. This GAS can also be used to handle user idle prompts by creating a GAS with waits and re-prompts. |

TABLE I-continued

Model Data Fields

| | |
|---|---|
| User Prompt GAS List | This GAS is played if the user touches a page of the book other than on a page pointer or volume adjuster, after doing a finger LED down transition. |

In the Flow Chart and Table I, DT means a down transition, of an obstruction, like a finger, into the light beam; UT means an up transition, of an obstruction, like a finger, into the light beam; GAS means generic audio sequence; BG means background; FG means foreground; and E means Event. There may be several types of GASes, as identified in Table 1. A GAS list is a series, or list, of different prompts that are cycled.

The algorithm for detecting if a finger is in the finger well or is not in the finger well includes mechanisms for determining a broken light beam in the finger well (always detecting a finger) and filters to keep very short finger well breaks (like a card flicking through the well) from being detected as a finger in the well. The software polls the finger well LED whenever the detector determines that the pen is not near the surface. The software filters the finger well polls so that a short break will not cause a down transition. If the finger well detector sees the beam broken for too long it will signal an up transition and clear the down status. It will not signal a down transition again until the beam is detected as unbroken for a period of time.

Figures 8A, 8B, 8C:
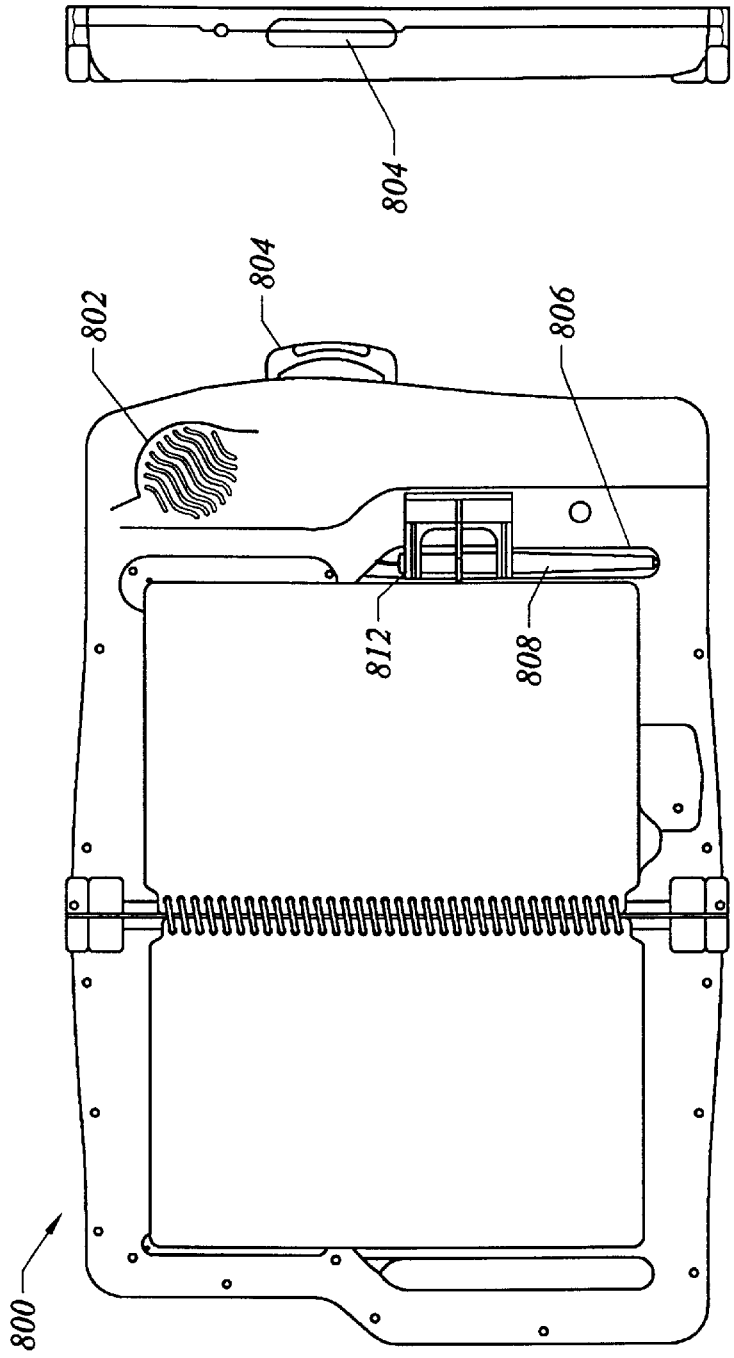
FIG. 8A shows a top view of a foldable platform, in an open configuration, with the print media in place.
FIG. 8B shows a side bottom view of a foldable platform, in an open configuration, with the print media in place.
FIG. 8C shows a side view of a foldable platform, in a closed configuration, with the print media in place.
Figure 9:
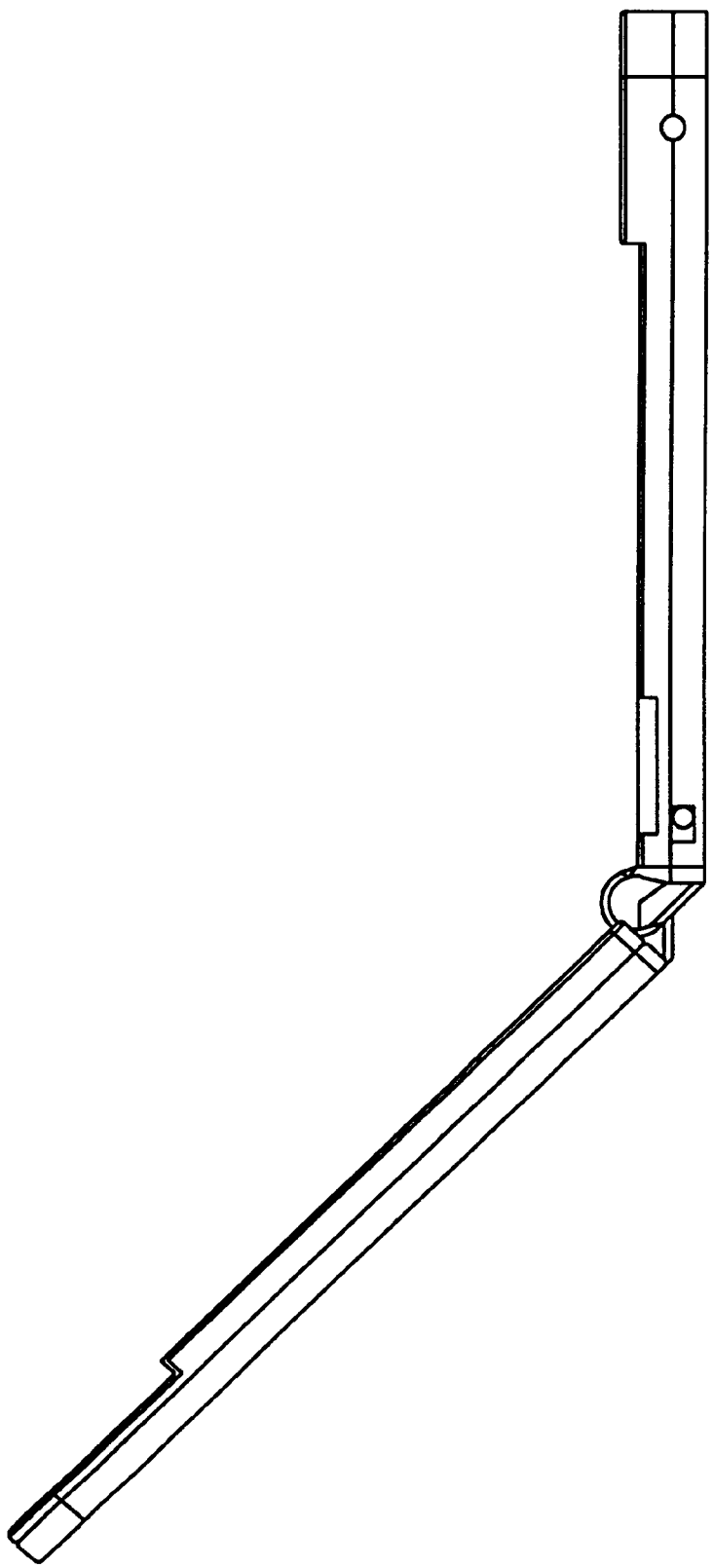
FIG. 9 shows a side view of the platform configured to close with a book in place.

FIGS. 8A, 8B, and 8C show three views of a foldable platform 800 having a booklet bound by a spiral binder on the foldable platform. FIG. 8A shows the placement of a speaker 802 and cartridge 804 in one possible embodiment of the invention. An indentation 806 outside the border provides a location to store a stylus 808 when the platform is brought to a closed configuration. The cartridge 804 may be disposed in a socket in a side of the platform. FIG. 8B shows a bottom side view of the platform 800, when it is in the open position. FIG. 8C shows a side view of the platform on the side that has the cartridge 804. An optional stylus holder 812 may be included to hold the stylus 812. FIG. 9 shows a side view of a partially closed platform with a booklet in place.

Figure 10:
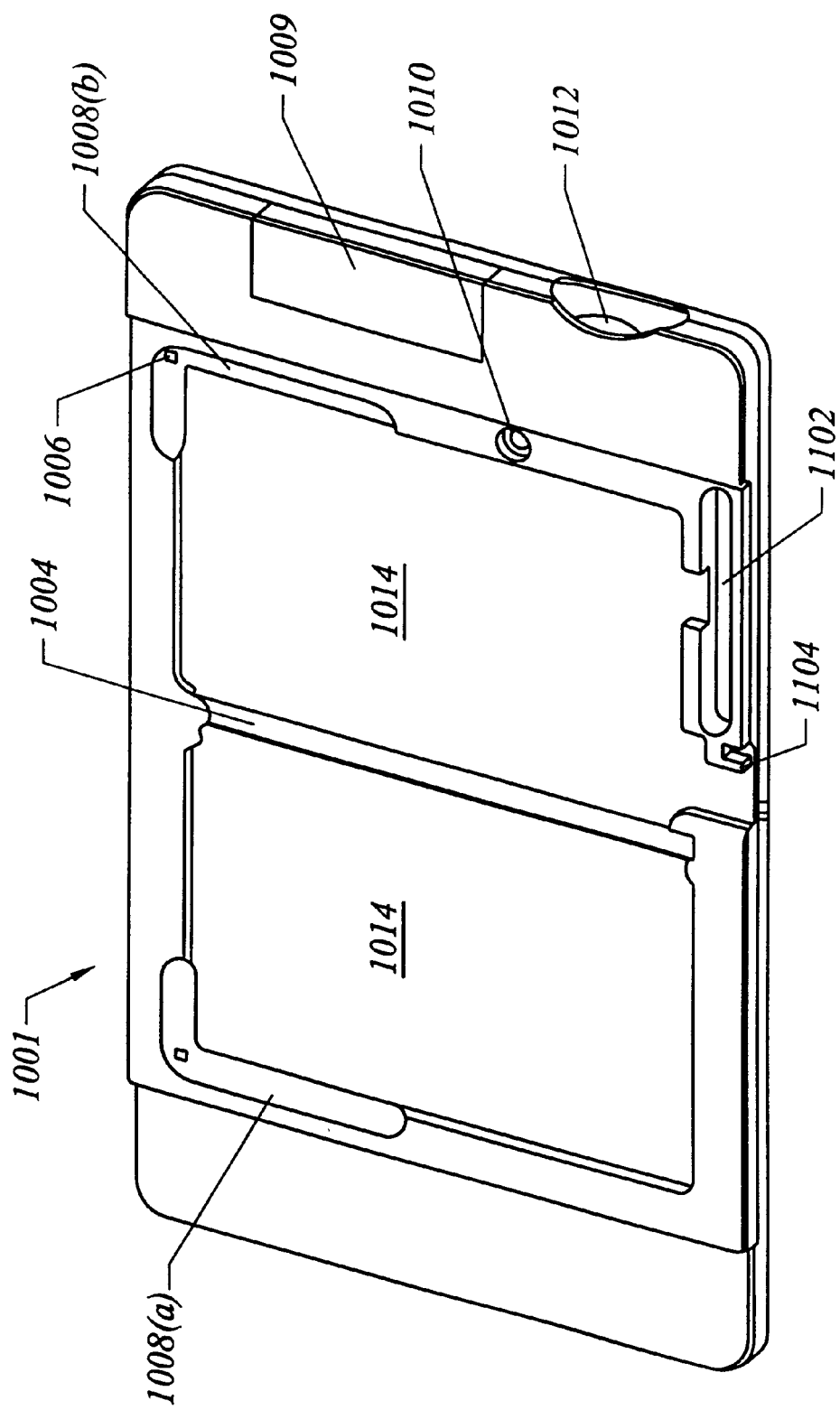
FIG. 10 shows a top perspective view of a rigid platform element of the present invention.

FIG. 10 shows another embodiment of a flat rigid platform 1001 that does not fold. The platform 1001 includes a recessed area 1014 for a print medium (not shown). In some embodiments, the recessed area 1014 may be referred to as a "cavity" for the print medium. A recess 1004 for a binding of a print medium may also be provided at the upper surface of the platform 1001.

Finger wells 1008(*a*), 1008(*b*) may be disposed in the platform 1001 to assist a user in turning the pages of the print medium. One of the finger wells 1008(*a*) may have a portion disposed to a left side of the recessed area 1014. The other finger well 1008(*b*) may have a portion disposed to a right side of the recessed area 1014. Each finger well 1008(*a*), 1008(*b*) may include an IR aperture 1006 at one end for emitting or receiving an IR signal from the other end of the finger well.

A stylus (not shown) may be stored in an indentation 1102 when the platform 1001 is not being used. A cable (not shown) for the stylus may be supplied through an exit area 1104 in the platform 1001. In some embodiments, the cable may be a retractable cable.

An on/off switch 1010 may be disposed at an upper surface of the platform 1001 to turn it on and off. Batteries (or other electrical supply mechanism) may be provided through a door 1009 to power the platform 1001. A socket 1012 may be provided in the platform 1001 so that a storage device such as a data cartridge (not shown) may be inserted into the socket 1012.

In some embodiments, the rigid platform 1001 is not configured to hold a book and may or may not use page tabs. In this embodiment, the platform is configured to accept sheet documents, game boards, or molded or formed rigid media. Examples of molded or formed rigid media include, for example, three-dimensional reliefs of a stovetop, topographical map, racetrack, or fantasy scene. Each can be accompanied with associated games or learning audio. Another example of a molded ridged media would be a representation of a battlefield, including an authentic historical model.

Figure 11:
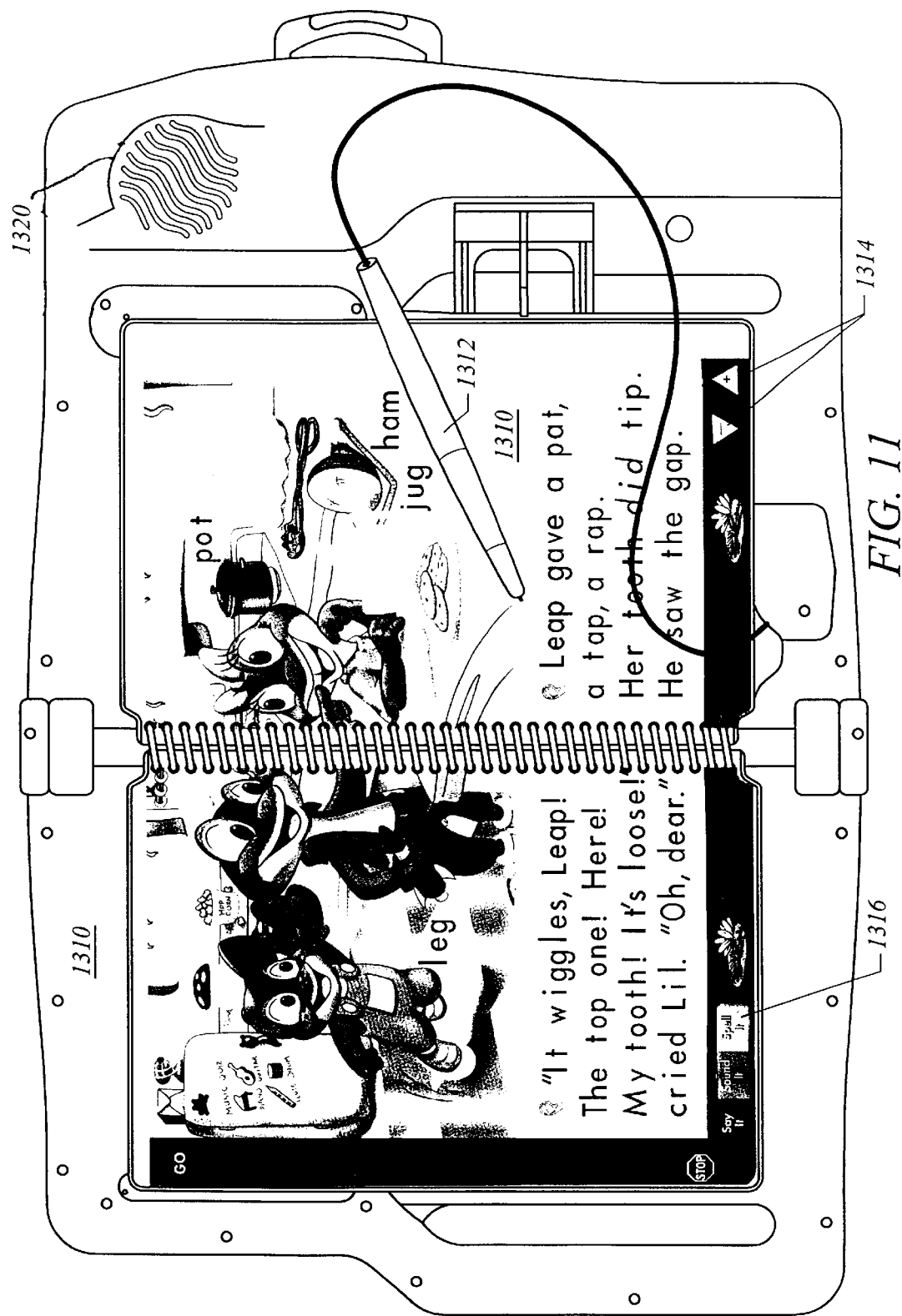
FIG. 11 shows a top view of an open book disposed on a platform of a print media receiving unit.

FIG. 11 is a top view of an open book 1310 disposed on a platform 1310 of a print media receiving unit. A stylus 1312 is operatively coupled to platform 1310. The open book 1310 has a spiral spine and fits within a recess in the platform 1310. The pages of the open book 1310 may include symbols 1314 for controlling the volume of sound heard through a speaker 1320. The user may use the stylus 1312 and touch or nearly touch the volume control symbols 1314 to turn the volume up or down by selecting a "+" or "−" symbol. Other symbols 1316 may be provided on the pages (e.g., at the borders) of the book 1310 to hear words, spell words, and/or sound out words that are selected on the pages of the open book 1310. For example, in the Figure, a "spell it" symbol may be selected first and then the word "leg" on the page can be selected by the user. The user will subsequently hear the sequence of letters l-e-g through the speaker 1320. Other symbols may be provided on the pages of the book 1310. For example, the user may select symbols for interactive games and learning activities. For example, after selecting a game symbol, a speech synthesizer in the platform may say "can you find a word with the letter L?" and the user can respond in kind by selecting the appropriate word with the stylus 1312. In addition to having interactive symbols printed on the pages of the open book 1310, interactive pictures and words may also be printed on the pages. For example, words or pictures may be highlighted to indicate to the user that they are selectable, and that the user will hear or see an audio or visual response to the selection. For instance, the user may select a picture of a fan and the sound of a fan may be produced by the platform.

Although the use of a stylus to select various print elements on a print medium have been described, it is understood that embodiments of the invention may respond to other stylus movements. For example, the print media receiving unit may respond to the user when the user lifts the stylus off of a print medium disposed on the surface of the print media receiving unit. In another embodiment, the print media receiving unit may respond when the stylus is held over a particular print element on the print medium for a predetermined period of time. In yet another embodiment, the print media receiving unit may respond to the use when the stylus is dragged through a print element (e.g., a symbol), into a print element, or out of a print element. For example, the print medium on the print media receiving unit may have a circle printed on it. A stylus can be dragged laterally across the circle. The print media receiving unit may respond when the stylus enters the circle from the edge of the circle, and may further respond if the stylus exits the circle. In another example, the user may drag the stylus across a word such as "sun" and the print media receiving unit may sound out the letters s-u-n.

In preferred embodiments, the detection system in the platform and stylus comprises dual transmitting RF antennas located in the platform under the print media receiver and a receiving antenna located in the stylus, combined with a microprocessor and position calculating algorithms. This electrographic detection system is the subject of a patent application filed by the assignee of the present application. The co-pending application, incorporated herein by reference, is entitled "Electrographic Position Location Antenna System And Method," Ser. No. 60/200,722 (attorney docket No. 6505/54080), filed Apr. 27, 2000.

Although preferred embodiments of the present invention and modifications thereof have been described in detail herein, it is to be understood that this invention is not limited to those precise embodiments and modifications, and that other modifications and variations may be affected by one of ordinary skill in the art without departing from the spirit and scope of the invention as defined in the appended claims. Moreover, one or more features of one or more embodiments may be combined in any suitable manner without departing from the scope of the invention.

What is claimed is:

1. A print media receiving unit comprising:
   a) a platform comprising a surface adapted to receive a print medium;
   b) a location detection system capable of determining a location of a selected region of the print medium;
   c) a socket in the platform wherein the socket is capable of receiving a memory device; &id
   d) a stylus operatively coupled to the platform, wherein the memory device comprises a flash memory device.

2. The print media receiving unit of claim 1 wherein the surface is defined by a recess in the platform.

3. The print media receiving unit of claim 1 wherein the location detection system comprises a radio-frequency antennae system.

4. The print media receiving unit of claim 1, further comprising a finger well to the side of the surface.

5. The print media receiving unit of claim 1 wherein the platform is foldable.

6. The print media receiving unit of claim 1 further comprising a spine receiving portion in the platform configured to receive a spine of the print medium.

7. The print media receiving unit of claim 1 further comprising a spine receiving portion in the platform in the form of an open slot.

8. The prim media receiving unit of claim 1 further comprising a spine receiving portion having a first end and a second end, and a plurality of tabs in the platform, wherein the tabs are proximate to at least one of the first end or the second end of the spine receiving portion.

9. The print media receiving unit of claim 1 further comprising a spine receiving portion having a first end and a second end, and a plurality of tabs in the platform, wherein the tabs are proximate to at least one of the first or the second end of the spine receiving portion, wherein the print medium is a spiral book comprising a spiral spine, and wherein the tabs at the first end or the second end of the spine receiving portion are offset from each other a distance that is substantially equal to a pitch of the spine.

10. The print media receiving unit of claim 1 wherein the flash memory device is in the form of a data cartridge.

11. The print media receiving unit of claim 1 further comprising an indentation for receiving the stylus.

12. An interactive print media system comprising:
    a print media receiving unit comprising a) a platform comprising a surface adapted to receive a print medium, b) a location detection system capable of determining a location of a selected region of the print medium, c) a socket in the platform wherein the socket is capable of receiving a memory device, and d) a stylus operatively coupled to the platform, wherein the memory device comprises a flash memory device; and the print medium, wherein the print medium is a book with a spiral spine.

13. The interactive print media system of claim 12 wherein the print medium has pages that are substantially free of sharp corners.

14. The interactive print media system of claim 12 wherein the print medium has pages with printed symbols for at least one of playing interactive games or adjusting the volume of the print media receiving unit.

15. A print media receiving unit comprising:
   a) a platform comprising a surface adapted to receive a print medium comprising a spine;
   b) a spine receiving portion in the platform configured to receive the spine of the print medium, the spine receiving portion having a first end and a second end;
   c) a location detection system capable of determining a location of a selected region of the print medium; and
   d) a plurality of tabs in the platform, wherein the tabs are proximate to at least one of the first end or the second end of the spine receiving portion, and further comprising a socket associated with the platform, wherein the socket is adapted to receive a memory device, wherein the memory device comprises a flash memory device.

16. The print media receiving unit of claim 15 wherein the tabs at the first end or the second end of the spine receiving portion are offset from each other.

17. A print media receiving unit comprising:
   a) a platform comprising a surface adapted to receive a print medium comprising a spine;
   b) a spine receiving portion in the platform configured to receive the spine of the print medium, the spine receiving portion having a first end and a second end;
   c) a location detection system capable of determining a location of a selected region of the print medium; and
   d) a plurality of tabs in the platform, wherein the tabs are disposed at a location proximate to at least one of the first end or the second end of the spine receiving portion, wherein the print medium is a spiral book comprising a spiral spine, and wherein the tabs at the first end or the second end of the spine receiving portion are offset from each other a distance that is substantially equal to a pitch of the spiral spine.

18. The print media receiving unit of claim 17 wherein the surface is defined by a recess in the platform.

19. The print media receiving unit of claim 17 wherein the location detection system comprises a radio-frequency antennae system.

20. The print media receiving unit of claim 17 further comprising a finger well to the side of the surface.

21. The print media receiving unit of claim 17 wherein the platform is foldable.

22. The print media receiving unit of claim 17 further comprising a stylus that is coupled to the platform, and wherein the location detection system comprises a radio-frequency antennae system.

23. The print media receiving unit of claim 17 wherein the spine receiving portion in the platform is in the form of an open slot.

24. The print media receiving unit of claim 17 wherein the platform further comprises a slot, and wherein a memory device is received in the slot.

25. The print media receiving unit of claim 17 wherein each of the tabs is tapered.

26. The print media receiving unit of claim 17 wherein the location detection system is housed in the platform.

27. The print media receiving unit of claim 17 further comprising a stylus coupled to the platform, and wherein the platform has an indentation for receiving the stylus.

28. The print media receiving unit of claim 17 further comprising a stylus coupled to the platform.

29. A print media receiving unit comprising:
   a) a platform comprising a surface adapted to receive a print medium comprising a spine;
   b) a spine receiving portion in the platform configured to receive the spine of the print medium, the spine receiving portion having a first end and a second end;
   c) a location detection system capable of determining a location of a selected region of the print medium; and
   d) a plurality of tabs in the platform, wherein the tabs are proximate to at least one of the first end or the second end of the spine receiving portion, wherein the tabs comprise side walls that are tapered.

30. The print media receiving unit of claim 29 wherein the surface is defined by a recess in the platform.

31. The print media receiving unit of claim 29 wherein the location detection system comprises a radio-frequency antennae system.

32. The print media receiving unit of claim 29 further comprising a finger well to the side of the surface, and wherein the platform has hinges.

33. The print media receiving unit of claim 29 wherein the platform is foldable and comprises a slot that is configured to receive a memory device.

34. The print media receiving unit of claim 29 further comprising a stylus that is coupled to the platform, and wherein the location detection system comprises a radio-frequency antennae system.

35. The print media receiving unit of claim 29 wherein the spine receiving portion is in the form of an open slot.

36. The print media receiving unit of claim 29 wherein the platform further comprises a slot, and wherein a memory device is received in the slot.

37. The print media receiving unit of claim 29 further comprising a stylus coupled to the platform.

38. The print media receiving unit of claim 29 wherein the location detection system is housed in the platform.

39. The print media receiving unit of claim 29 further comprising an indentation for receiving the stylus.

40. The print media receiving unit of claim 29 further comprising a stylus coupled to the platform, and wherein the location detection system is housed in the platform.

41. An interactive print media system comprising:
   a print media receiving unit comprising a) a platform comprising a surface adapted to receive a print medium comprising a spine, b) a spine receiving portion in the platform configured to receive the spine of the print medium, the spine receiving portion having a first end and a second end, c) a location detection system capable of determining a location of a selected region of the print medium, and d) a plurality of tabs in the platform, wherein the tabs are disposed at a location proximate to at least one of the first end or the second end of the spine receiving portion, wherein the tabs comprise side walls that are tapered; and the print medium, wherein the spine is a spiral spine.

42. The interactive print media system of claim 41 wherein the print medium has pages that are substantially free of sharp corners.

43. The interactive print media system of claim 41 wherein the print medium has pages with printed symbols for at least one of playing interactive games or adjusting the volume of the print media receiving unit.

44. A print media receiving unit comprising:
   a) a platform comprising a surface adapted to receive a print medium comprising a spine, wherein the surface is defined by edges that restrict the movement of the print medium while the print medium is on the platform;
   b) a spine receiving portion configured to receive the spine of the pant medium, the spine receiving portion having a first end and a second end;
   c) a location detection system capable of determining a location of a selected region of the print medium;
   d) a plurality of tabs in the platform, wherein the tabs are proximate to at least one of the first end and the second end of the spine receiving portion;
   e) a socket in the platform wherein the socket is capable of receiving a memory device; and
   f) a stylus operatively coupled to the platform, wherein the stylus is adapted to select regions of the print medium, wherein the print medium is a spiral book comprising a spiral spine, and wherein tabs at the first end or the second end of the spine receiving portion are offset from each other a distance that is substantially equal to a pitch of the spiral spine.

45. The print media receiving unit of claim 44 further comprising a retractable cable, wherein the retractable cable couples the stylus to the platform.

46. The print media receiving unit of claim 44 further comprising a stylus storage indentation in the platform.

47. An interactive print media system comprising:
   a print media receiving unit comprising a) a platform comprising a surface adapted to receive a print medium comprising a spine, wherein the surface is defined by edges that restrict the movement of the print medium while the print medium is on the platform, b) a spine receiving portion configured to receive the spine of the print medium, the spine receiving portion having a first end and a second end, c) a location detection system capable of determining a location of a selected region of the print medium, d) a plurality of tabs in the platform, wherein the tabs are proximate to at least one of the first end and the second end of the spine receiving portion, e) a socket in the platform wherein the socket is capable of receiving a memory device, and f) a stylus operatively coupled to the platform, wherein the stylus is adapted to select regions of the print medium, wherein the print medium is a spiral book comprising a spiral spine, and wherein tabs at the first end or the second end of the spine receiving portion are offset from each other a distance that is substantially equal to a pitch of the spiral spine; and
   the print medium.

48. The interactive print media system of claim 47 wherein the print medium has pages that are substantially free of sharp corners.

49. The interactive print media system of claim 47 wherein the print medium has pages with printed symbols for at least one of playing interactive games or adjusting the volume of the print media receiving unit.

* * * * *

UNITED STATES PATENT AND TRADEMARK OFFICE
CERTIFICATE OF CORRECTION

PATENT NO. : 6,668,156 B2
DATED : December 23, 2003
INVENTOR(S) : Larry Lynch et al.

It is certified that error appears in the above-identified patent and that said Letters Patent is hereby corrected as shown below:

Columns 12 and 13,
Lines 1-9, delete claims 1-28.

Column 14,
Renumber claim "29" as claim -- 1 --.
Line 22, renumber claim "30" as claim -- 2 --; and delete "29" and insert therefor -- 1 --
Line 24, renumber claim "31" as claim -- 3 --; and delete "29" and insert therefor -- 1 --.
Line 27, renumber claim "32" as claim -- 4 --; and delete "29" and insert therefor -- 1 --.
Line 30, renumber claim "33" as claim -- 5 --; and delete "29" and insert therefor -- 1 --.
Line 33, renumber claim "34" as claim -- 6 --; and delete "29" and insert therefor -- 1 --.
Line 37, renumber claim "35" as claim -- 7 --; and delete "29" and insert therefor -- 1 --.
Line 39, renumber claim "36" as claim -- 8 --; and delete "29" and insert therefor -- 1 --.
Line 42, renumber claim "37" as claim -- 9 --; and delete "29" and insert therefor -- 1 --.
Line 44, renumber claim "38" as claim -- 10 --; and delete "29" and insert therefor -- 1 --.
Line 46, renumber claim "39" as claim -- 11 --; and delete "29" and insert therefor -- 1 --.
Line 48, renumber claim "40" as claim -- 12 --; and delete "29" and insert therefor -- 1 --.
Line 51, renumber claim "41" as claim -- 19 --.
Line 65, renumber claim "42" as claim -- 20 --; and delete "41" and insert therefor -- 13 --.

Column 15,
Line 1, renumber claim "43" as claim -- 21 --; and delete "41" and insert therefor -- 13 --.

Columns 15 and 16,
Delete cancelled claims 44-49.

Column 16,
Add the following missing claims 16-27.
-- 13. The print media receiving unit of claim 1 wherein each tab in the plurality of tabs includes a side wall that is tapered about 5 degrees to about 7 degrees.
14. The print media receiving unit of claim 1 wherein each tab in the plurality of tabs includes a side wall that is tapered about 5 degrees or more.
15. The print media receiving unit of claim 14 wherein each tab in the plurality of tabs includes a chamfered edge.

UNITED STATES PATENT AND TRADEMARK OFFICE
CERTIFICATE OF CORRECTION

PATENT NO. : 6,668,156 B2
DATED : December 23, 2003
INVENTOR(S) : Larry Lynch et al.

It is certified that error appears in the above-identified patent and that said Letters Patent is hereby corrected as shown below:

<u>Col. 16, (cont'd),</u>
16. The print media receiving unit of claim 14 wherein each tab in the plurality of tabs includes a chamfered edge that has a degree of chamfer that is about 30 degrees or less.
17. The print media receiving unit of claim 1 wherein each tab is adapted to guide a page of the print medium as the page falls toward the platform.
18. The interactive print media system of claim 14 wherein each tab is adapted to guide a page of the print medium as the page falls toward the platform.
22. The interactive print media system of claim 19 wherein each tab in the plurality of tabs includes a side wall that is tapered about 5 degrees to about 7 degrees.
23. The interactive print media system of claim 19 wherein each tab in the plurality of tabs includes a side wall that is tapered about 5 degrees or more.
24. The interactive print media system of claim 23 wherein each tab in the plurality of tabs includes a chamfered edge.
25. The interactive print media system of claim 23 wherein each tab in the plurality of tabs includes a chamfered edgethat has a degree of chamfer that is about 30 degrees or less.
26. The print media receiving unit of claim 19 wherein each tab is adapted to guide a page of the print medium as the page falls toward the platform.
27. The interactive print media system of claim 23 wherein each tab is adapted to guide a page of the print medium as the page falls toward the platform. --

Signed and Sealed this

Thirty-first Day of May, 2005

JON W. DUDAS
*Director of the United States Patent and Trademark Office*

UNITED STATES PATENT AND TRADEMARK OFFICE
CERTIFICATE OF CORRECTION

PATENT NO. : 6,668,156 B2
DATED : December 23, 2003
INVENTOR(S) : Larry Lynch et al.

It is certified that error appears in the above-identified patent and that said Letters Patent is hereby corrected as shown below:

<u>Columns 12 and 13,</u>
Lines 1-9, delete claims 1-28.

<u>Column 14,</u>
Renumber claim "29" as claim -- 1 --.
Line 22, renumber claim "30" as claim -- 2 --; and delete "29" and insert therefor -- 1 --
Line 24, renumber claim "31" as claim -- 3 --; and delete "29" and insert therefor -- 1 --.
Line 27, renumber claim "32" as claim -- 4 --; and delete "29" and insert therefor -- 1 --.
Line 30, renumber claim "33" as claim -- 5 --; and delete "29" and insert therefor -- 1 --.
Line 33, renumber claim "34" as claim -- 6 --; and delete "29" and insert therefor -- 1 --.
Line 37, renumber claim "35" as claim -- 7 --; and delete "29" and insert therefor -- 1 --.
Line 39, renumber claim "36" as claim -- 8 --; and delete "29" and insert therefor -- 1 --.
Line 42, renumber claim "37" as claim -- 9 --; and delete "29" and insert therefor -- 1 --.
Line 44, renumber claim "38" as claim -- 10 --; and delete "29" and insert therefor
-- 1 --.
Line 46, renumber claim "39" as claim -- 11 --; and delete "29" and insert therefor
-- 1 --.
Line 48, renumber claim "40" as claim -- 12 --; and delete "29" and insert therefor
-- 1 --.
Line 51, renumber claim "41" as claim -- 19 --.
Line 65, renumber claim "42" as claim -- 20 --; and delete "41" and insert therefor
-- 19 --.

<u>Column 15,</u>
Line 1, renumber claim "43" as claim -- 21 --; and delete "41" and insert therefor
-- 19 --.

<u>Columns 15 and 16,</u>
Delete cancelled claims 44-49.

<u>Column 16,</u>
Add the following missing claims 16-27.
-- 13. The print media receiving unit of claim 1 wherein each tab in the plurality of tabs includes a side wall that is tapered about 5 degrees to about 7 degrees.
14. The print media receiving unit of claim 1 wherein each tab in the plurality of tabs includes a side wall that is tapered about 5 degrees or more.
15. The print media receiving unit of claim 14 wherein each tab in the plurality of tabs includes a chamfered edge.

UNITED STATES PATENT AND TRADEMARK OFFICE
CERTIFICATE OF CORRECTION

PATENT NO. : 6,668,156 B2
DATED : December 23, 2003
INVENTOR(S) : Larry Lynch et al.

It is certified that error appears in the above-identified patent and that said Letters Patent is hereby corrected as shown below:

<u>Col. 16, (cont'd),</u>
16. The print media receiving unit of claim 14 wherein each tab in the plurality of tabs includes a chamfered edge that has a degree of chamfer that is about 30 degrees or less.
17. The print media receiving unit of claim 1 wherein each tab is adapted to guide a page of the print medium as the page falls toward the platform.
18. The interactive print media system of claim 14 wherein each tab is adapted to guide a page of the print medium as the page falls toward the platform.
22. The interactive print media system of claim 19 wherein each tab in the plurality of tabs includes a side wall that is tapered about 5 degrees to about 7 degrees.
23. The interactive print media system of claim 19 wherein each tab in the plurality of tabs includes a side wall that is tapered about 5 degrees or more.
24. The interactive print media system of claim 23 wherein each tab in the plurality of tabs includes a chamfered edge.
25. The interactive print media system of claim 23 wherein each tab in the plurality of tabs includes a chamfered edgethat has a degree of chamfer that is about 30 degrees or less.
26. The print media receiving unit of claim 19 wherein each tab is adapted to guide a page of the print medium as the page falls toward the platform.
27. The interactive print media system of claim 23 wherein each tab is adapted to guide a page of the print medium as the page falls toward the platform. --.

This certificate supersedes Certificate of Correction issued May 31, 2005.

Signed and Sealed this

Twenty-first Day of March, 2006

JON W. DUDAS
*Director of the United States Patent and Trademark Office*